US006589298B1

(12) United States Patent
Limoges et al.

(10) Patent No.: US 6,589,298 B1
(45) Date of Patent: Jul. 8, 2003

(54) SURFACE TREATMENT OF METALLIC COMPONENTS OF ELECTROCHEMICAL CELLS FOR IMPROVED ADHESION AND CORROSION RESISTANCE

(75) Inventors: David L. Limoges, Etobicoke (CA); Gino Palumbo, Etobicoke (CA); Peter K. Lin, Toronto (CA); Klaus Tomantschger, Etobicoke (CA)

(73) Assignee: Integran Technologies, Inc., Toronto (CA)

( * ) Notice: Subject to any disclaimer, the term of this patent is extended or adjusted under 35 U.S.C. 154(b) by 0 days.

(21) Appl. No.: 09/580,370

(22) Filed: May 26, 2000

(51) Int. Cl.⁷ .............................. H01M 6/00; B23P 13/00
(52) U.S. Cl. ............................................ 29/623.1; 29/2
(58) Field of Search ........................ 29/623.1, 2, 623.3, 29/731, 730

(56) References Cited

U.S. PATENT DOCUMENTS

| 3,844,846 A | | 10/1974 | Friske ................... 148/11.5 R |
|---|---|---|---|
| 3,929,513 A | | 12/1975 | Mao |
| 3,953,244 A | | 4/1976 | Prengaman |
| 3,986,894 A | * | 10/1976 | Ciliberti, Jr. ................. 429/153 |
| 4,044,220 A | * | 8/1977 | Glagola ....................... 219/119 |
| 4,085,792 A | * | 4/1978 | Eberle ......................... 164/72 |
| 4,483,785 A | | 11/1984 | Johnson et al. |
| 4,601,768 A | * | 7/1986 | Bouyoucos et al. ....... 156/73.5 |
| 4,978,601 A | | 12/1990 | Kim et al. |
| 5,521,029 A | | 5/1996 | Fiorino et al. |
| 5,593,798 A | | 1/1997 | Muller et al. |
| 5,816,088 A | | 10/1998 | Yamada et al. |
| 5,858,575 A | | 1/1999 | Chen |
| 5,932,120 A | | 8/1999 | Mannava et al. |
| 6,144,012 A | * | 11/2000 | Dulaney et al. ....... 219/121.85 |

FOREIGN PATENT DOCUMENTS

| EP | 875954 | * | 4/1998 | .......... H01M/12/06 |
|---|---|---|---|---|
| EP | 933 438 A1 | | 8/1999 | |
| JP | 59 013057 | | 1/1984 | |
| JP | 59 107068 | | 6/1984 | |
| JP | 59-153962 | * | 9/1984 | ................. 123/549 |
| JP | 4-58409 | * | 2/1992 | .......... H01B/13/00 |
| WO | WO 01/90433 A2 | | 11/2001 | |

OTHER PUBLICATIONS

Abstract of JP 59 107068.
Abstract of JP 59 013057.
D. Birchon: "Dictionary of Metallurgy", 1965, George Newnes Ltd., London, XP–002209192, pp. 14–15 No date available.
Czyryca, E.J., et al., "The Fatigue and Corrosion Fatigue Properties of Alloy 625 and 70/30 Copper–Nickel Alloy Electroslag Surfacing", Abstract, 1997, XP002186101 No date available.

* cited by examiner

*Primary Examiner*—Stephen Kalafut
*Assistant Examiner*—R. Alejandro
(74) *Attorney, Agent, or Firm*—Ridout & Maybee LLP; Randall S. Mitchell

(57) ABSTRACT

A process for enhancing chemical stability, corrosion resistance and for improved adhesion characteristics is described for use on metal or metal-alloy non-consumable electrodes, current collectors or other metallic articles used in electrochemical cells. The process includes peening of the article, optionally followed by an annealing treatment.

29 Claims, 1 Drawing Sheet

Figure 1: Cross-section of shot-peened bookmould grid
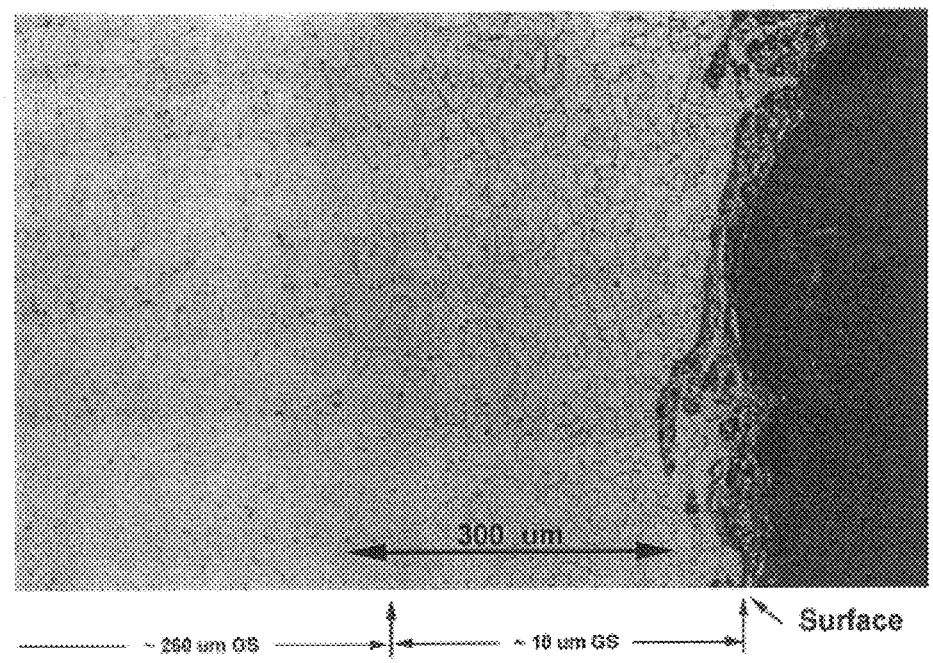

SURFACE TREATMENT OF METALLIC COMPONENTS OF ELECTROCHEMICAL CELLS FOR IMPROVED ADHESION AND CORROSION RESISTANCE

FIELD OF THE INVENTION

This invention relates to a process for the surface treatment of non-consumable electrodes, current collectors and other metallic components of electrochemical cells to improve the corrosion resistance of such components and to increase their surface area and modify the surface texture, thereby enhancing the adherence of coatings applied to the surface, including pastes and active materials.

Electrochemical cells utilizing numerous electrodes and current collectors are used in a variety of commercial applications. Non-consumable electrodes, current collectors or other metallic components find use in the electrowinning of metals, in other electrochemical processing applications, gas diffusion electrodes used in metal-air batteries, fuel cells and gas sensors. They include the use of non-consumable electrodes such as DSA (dimensionally stable anodes) used in a number of electrochemical synthesis applications e.g. electrowinning of metals practiced on a large scale in the production of electrorefined zinc and copper. Cobalt, nickel, chromium, manganese, cadmium, gallium, thallium, indium, silver and gold have been reported to also be produced using electrolytic processes.

Electrolysis is also used to manufacture sodium, potassium or ammonium salts of several peracids including persulfates, perchlorates, periodates and perborates by anodic oxidation of sulfate, chlorate, iodate and borax respectively, and electrolysis is the only commercial process used for several of these anions. The electrochemical formation of all these peroxyanions requires high positive electrode potentials in typically acidic electrolytes. Anodes typically comprise platinum or lead-dioxide coatings on a base metal collector. Electrochemical oxidation is also used to produce permanganates at temperatures of about 60° C. in caustic electrolytes, using nickel or monel anodes.

Other electrochemical devices include storage batteries employing current collectors to retain the active mass and provide the electric conductivity required to charge/discharge the plates.

This invention describes a novel surface treatment of non-consumable electrodes, current collectors or other metallic components for use in electrochemical cells to enhance corrosion resistance and adhesion. The treatment consists of peening the surface of the article, or a precursor of the article; for instance peening a metal or metal alloy strip prior to punching or expanding it into a battery grid. To enhance the corrosion resistance further the peening can be followed by a heat treatment. Additional improvements to the corrosion resistance can be achieved if the peening/annealing treatments are repeated. The peening also modifies the surface texture, enlarging the surface area and enhancing adhesion of active materials or coatings.

DESCRIPTION OF PRIOR ART

To enhance the longevity of non-consumable electrodes, current collectors and other metallic components for use in electrochemical cells a variety of metal, metal alloys and composites have been developed. In many applications the environment to which the metallic articles are exposed is highly corrosive. Research has been carried out to find ways of enhancing the stability, e.g. by reducing the corrosion-induced weight loss and growth. These can become a problem, particularly when the component is exposed to oxidizing potentials.

The prior art describes the use of coatings on current collectors and non-consumable electrodes to enhance stability and longevity. In the case of storage battery electrodes, the active material or paste needs to adhere to the collector to maintain good electrical contact throughout the service life. To enhance adhesion of coatings and pastes means of modifying the surface of current collectors and non-consumable electrodes have been proposed.

Mao in U.S. Pat. No. 3,929,513 (1975) describes a corrosion resistant lead-alloy product for use in a lead-acid battery having a thin surface layer created by heat-treatment and following quenching of an article manufactured using pressure casting.

Prengaman in U.S. Pat. No. 3,953,244 (1976) describes stable wrought lead-calcium-tin alloys which are prepared by casting, cold working the casting, preferably using rolling to one quarter of the original thickness, within two to three days after casting and heating aged work pieces sufficiently to dissolve the precipitated calcium phases.

Johnson in U.S. Pat. No. 4,483,785 (1979) described an improved current collector and/or container for use in high temperature battery applications comprising a non-corrosive, conductive ceramic member and a conductive metal cladding attached to a substantial portion of the surface.

Kim in U.S. Pat. No. 4,978,601 (1990) discloses a method of laser treating lead-containing battery grids that relies on virtually instantaneous melting and solidification of the surface, thereby yielding an improved fine-grained microstructure improving mechanical and corrosion resistant properties.

Fiorino in U.S. Pat. No. 5,521,029 (1996) describes a current collector for a lead-acid battery, wherein the substrate is the current collector coated with conductive titanium suboxides to enhance the corrosion resistance.

Muller in U.S. Pat. No. 5,593,798 (1997) describes a method of producing corrosion resistant electrodes and other surfaces in corrosive batteries using ion-implantation.

Yu-Lin in U.S. Pat. No. 5,858,575 (1999) describes a method for extending the high temperature cycle-life of a lead-acid battery positive electrode current collector by immersing the lead-alloy mesh in a lead-antimony or lead-silver molten metal bath to apply a coating.

Palumbo et al. in International Publication No. WO 99/07911 describe a method for processing a lead-based alloy electrowinning electrode material to improve its properties by a repetitive sequence of cold deformation and recrystallization heat treatment steps, within specified limits of deformation, temperature and annealing times, which has the effect of significantly increasing the frequency of "special" grain boundaries in the microstructure of the electrode material.

The present invention affords a novel surface treatment for non-consumable electrodes, current collectors and like components of electrochemical cells, which comprises peening the surface of the component, or a precursor of the electrochemical cell component, as by peening a metal or metal alloy strip prior to punching or expanding it into a battery grid.

Peening consists of directing a stream of shot at high velocity on the surface of the metal component under controlled conditions. As such, it is a special method of cold working, which induces compressive stresses confined to the surface layer of a metallic article.

Peening has been used for the purpose of relieving tensile stresses that contribute to stress-corrosion cracking in metallic articles. Yamada in U.S. Pat. No. 5,816,088 describes a surface treatment method for a steel workpiece using high speed shot peening. In U.S. Pat. No. 5,932,120 (Mannava) there is described a laser shock peening apparatus which employs a low energy laser.

We have discovered that the application of peening to a component of an electrochemical cell, such as a non-consumable electrode, or to an immediate precursor of such a component, not only enhances corrosion resistance in the chemical environment encountered by such components, but also improves the surface adhesion to the component of active materials or coatings used in the electrochemical cell. By following the peening operation with an appropriate heat treatment, the corrosion resistance of the cell component may be enhanced still further.

SUMMARY OF THE INVENTION

It is an object of the present invention to provide electrochemical cell components, in particular non-consumable electrodes and current collectors, which exhibit a high degree of chemical stability and good adhesion properties.

It is a further object of the present invention to provide a process for treatment of a finished electrochemical cell component which improves its operating properties without substantial dimensional deformation of the component.

It is a still further object of the present invention to modify the surface texture of an electrochemical cell component so as to increase the surface area and improve the adhesion thereto of coatings and pastes.

With a view to achieving these objects there is provided a method for treatment of the surface of a metallic component or precursor thereof used in an electrochemical cell, comprising shot, laseror hammer peening said component. Optionally, the peening step may advantageously be followed by annealing the component at a temperature below its melting point.

BRIEF DESCRIPTION OF THE DRAWINGS

The single drawing FIGURE is a reproduction of a cross-sectional optical micrograph of a Pb-alloy bookmould cast grid which has been surface-peened followed by heat treatment according to the present invention.

PREFERRED EMBODIMENTS OF THE INVENTION

Non-consumable electrodes, current collectors and metallic articles are well known in the art of electrochemical cell designs and a variety of forms, shapes and sizes, manufactured using a variety of processing techniques are employed. In the zinc-electrowinning process, for instance, Pb/1% Ag alloys are typically used as the oxygen-evolving anode. While the Al-sheet cathodes in typical operations have an operating life in the order of four years, vertically cast lead-alloy anodes typically have an operating life limited to two years or less. Rolled anodes are available, however, they typically have only about 20% market share, as the additional cost does not justify their use. A procedure to treat vertically-cast anodes and improve their longevity can therefore offer substantial economic benefits. Pb anodes are also used in a variety of other electrolytic process applications, e.g., water electrolysis or water treatment, the production of ozone and, as noted, in the production of peracids including persulfates, perchlorates, periodates and perborates. Pb/5% Sb anodes are also the anode material of choice for the production of potassium dichromate and chromic acid. Pb anodes are also used in the production of electrolytic manganese dioxide (EMD), although, titanium is currently the material of choice. Lead-anodes are also used in organic electrosynthesis, e.g. the hydromerization of acrylonitrile (Monsanto process).

Current collectors are utilized in storage battery grids manufactured by methods including bookmold casting of metal and metal alloys as e.g. practiced in the manufacture of lead-acid battery grids. Processing techniques used also include casting, extruding or rolling a sheet or strip, optionally followed by punching or expansion into a perforated structure or mesh, to form current collectors used in lead-acid, nickel-cadmium, lithium and other battery chemistries. Metal sheets and foils are used e.g. in thin-metal-film battery designs and other unipolar or bipolar cell designs employed in galvanic cell designs. In the case of $MnO_2$—Zn alkaline galvanic cells for instance, nickel-plated steel strip is deep drawn into a can, which forms the container and the positive electrode current collector of the cell. Various button and coin cells also rely on metal cans, cups and discs which act as current collectors for positive and negative electrodes and, at the same time, form part of the cell container or cell housing. The metallic part in contact with the positive electrode is typically nickel-plated steel strip formed into a suitable shape, optionally coated with a graphite emulsion. Metallic parts contacting the negative electrode commonly use copper, brass or bronze, frequently electro or electroless plated onto a steel substrate, optionally further coated with indium, tin, lead, mercury or bismuth. Machined, extruded or molded conductive flow plates are also used in electrochemical cell designs, including fuel cells.

Scientists continue to explore means of enhancing the corrosion performance and the adhesion characteristics of the non-consumable electrodes, current collectors and other metallic parts used in electrochemical cells typically exposed to electrolyte and various electrochemical potentials. Various metal, metal alloys and composites have been used for a variety of applications to improve longevity. Means of enhancing the corrosion properties by employing new compositions, surface coatings and treatments have also been described. Means of modifying the surface texture of current collectors to increase the surface or contact area to prevent the flaking off, peeling off or delamination of coatings, or the flaking off or shedding of pates are also continuously researched.

Shot, laser or hammer peening used to treat the surface layer of electrochemical cell components according to the present invention is a species of cold-working, albeit confined to the surface regions of an article.

When shot in a high-intensity stream contacts the test article surface, they produce light, rounded depressions in the surface, causing a plastic flow to extend up to 1 mm (0.04") below the surface. The metal beneath this layer remains substantially unaffected. The penetration depth of the peening into the exposed surface of the article can be controlled by the hardness, weight and size of the shot and the impact velocity and treatment time.

The optional heat-treatment, following the peening, is carried out at temperatures and times sufficient to allow recrystallization to occur, which depends largely on the chemical composition of the test article. In the case of lead-alloys, depending on the composition, generally 100 to 300C for a time period of between 10 seconds and 30 minutes is required.

EXAMPLE 1

30 cm long sections were cut from a 10 cm wide lead alloy strip. One set of section was shot peened, the other (control) was left untreated. The ASTM D 1876–95 peel test was applied to determine the adhesion. The samples cut to a width of 25 mm, cleaned in an ultrasonic bath with acetone and bent to a 90° angle, 4 to 5 cm from the end that had previously been clamped. To simulate the application of a paste containing active material a film of epoxy (Hysol EPK 608 epoxy) was used. Two samples were bonded together by the epoxy, followed by suitable curing (24 hours). The samples were tested using the Instron 4201 Universal Tester. The results are listed in the table. The T-peel test demonstrated that the peened surface improved uniformity of the bond strength and cohesion failure was observed with these specimens. The smooth (control) surface specimens exhibited adhesion failure.

|  | Peel Strength [N] |
|---|---|
| Control | 189 |
| This Invention | >291* |

*In this test the epoxy film fractured (cohesion failure) and did not delaminate from the substrate.

This test clearly indicates that the shot peened surface results in a substantial improvement (over 50%) in the adhesion.

EXAMPLE 2

A set of Pb-alloy bookmould cast grids was surface peened for 10 seconds, followed by heat treatment (275 C, 10 minutes). Careful analysis of grid cross sections revealed that the penetration depth achieved extended up to 350 micron below the peened surface and that the grain size in the near surface layer was 10 micron, while it remained at about 260 micron in the bulk material. FIG. 1 shows a cross-sectional optical micrograph of the treated sample.

Similar results were obtained when the invention was applied to lead and lead alloy lugs, straps, intercell welds used in lead-acid batteries and to aluminum, copper, iron, nickel, silver and zinc containing components.

We claim:

1. A method for treating the surface of a metallic component of an electrochemical cell by modifying the outer surface of the component, comprising the step of peening the component or a precursor of said component; with the proviso that said component and said precursor of said component comprises lead or lead alloy.

2. A method according to claim 1, wherein said step of peening is followed by annealing said metallic component at a temperature below the melting point of the metallic component to enhance corrosion resistance of the metallic component.

3. A method according to claim 1 or claim 2, wherein said metallic component is a current collector for a lead-acid battery.

4. A method according to claim 1 or claim 2, wherein said metallic component is a non-consumable electrode comprising lead or lead alloy, for use as an electrode in said electrochemical cell.

5. A method according to claim 1, wherein said metallic component is in the form of a metallic foil.

6. A method according to claim 1, wherein said component is a cast grid.

7. A method according to claim 1, wherein said component is a lead or lead alloy lug, strap or intercell weld used in a lead-acid battery.

8. A method according to claim 1, wherein peening is effected by a process of shot peening.

9. A method according to claim 1, wherein peening is effected by laser peening.

10. A method according to claim 1, wherein peening is affected by hammer peening.

11. A method for treating the surface of a metallic component of an electrochemical cell by modifying the outer surface of the component, comprising the step of peening the component or a precursor of said component; said peening being performed without substantially causing dimensional deformation of said component.

12. The method according to claim 11, wherein said step of peening is followed by annealing said metallic component at a temperature below the melting point of the metallic component to enhance corrosion resistance of the metallic component.

13. The method according to claim 11 or claim 12, wherein said metallic component is a current collector for a lead-acid battery.

14. The method according to claim 11 or claim 12, wherein said metallic component is a non-consumable electrode comprising lead or lead alloy, for use as an electrode in said electrochemical cell.

15. The method according to claim 11, wherein said metallic component is in the form of a metallic foil.

16. The method according to claim 11, wherein said component is a cast grid.

17. The method according to claim 11, wherein said component is a lead or lead alloy lug, strap or intercell weld used in a lead-acid battery.

18. The method according to claim 11, wherein peening is effected by a process of shot peening.

19. The method according to claim 11, wherein peening is effected by laser peening.

20. The method according to claim 11, wherein peening is affected by hammer peening.

21. A method for treating the surface of a metallic component used in an electrochemical cell by modifying the outer surface of the component, comprising the step of peening the component or a precursor of said component followed by annealing said metallic component at a temperature below the melting point of the metallic component to enhance corrosion resistance of the metallic component, with the proviso that said component or precursor of said component is a component used within said cell.

22. The method according to claim 21, wherein said metallic component is a current collector for a lead-acid battery.

23. The method according to claim 21, wherein said metallic component is a non-consumable electrode comprising lead or lead alloy, for use as an electrode in said electrochemical cell.

24. The method according to claim 21, wherein said metallic component is in the form of a metallic foil.

25. The method according to claim 21, wherein said component is a cast grid.

26. The method according to claim 21, wherein said component is a lead or lead alloy lug, strap or intercell weld used in a lead-acid battery.

27. A method according to claim 21, wherein peening is effected by a process of shot peening.

28. A method according to claim 21, wherein peening is effected by laser peening.

29. A method according to claim 21, wherein peening is affected by hammer peening.

* * * * *